United States Patent
Singh et al.

(10) Patent No.: US 12,067,644 B2
(45) Date of Patent: Aug. 20, 2024

(54) COMPUTER VISION SYSTEMS AND METHODS FOR OBJECT DETECTION WITH REINFORCEMENT LEARNING

(71) Applicant: Insurance Services Office, Inc., Jersey City, NJ (US)

(72) Inventors: Maneesh Kumar Singh, Lawrenceville, NJ (US); Sina Ditzel, Leuven (BE)

(73) Assignee: Insurance Services Office, Inc., Jersey City, NJ (US)

( * ) Notice: Subject to any disclaimer, the term of this patent is extended or adjusted under 35 U.S.C. 154(b) by 595 days.

(21) Appl. No.: 17/123,197

(22) Filed: Dec. 16, 2020

(65) Prior Publication Data

US 2021/0182533 A1 Jun. 17, 2021

Related U.S. Application Data

(60) Provisional application No. 62/948,532, filed on Dec. 16, 2019.

(51) Int. Cl.
| | |
|---|---|
| *G06T 11/00* | (2006.01) |
| *G06F 18/2431* | (2023.01) |
| *G06N 20/00* | (2019.01) |
| *G06T 11/20* | (2006.01) |
| *G06V 10/25* | (2022.01) |
| *G06V 10/764* | (2022.01) |
| *G06V 20/64* | (2022.01) |

(52) U.S. Cl.
CPC .......... *G06T 11/00* (2013.01); *G06F 18/2431* (2023.01); *G06N 20/00* (2019.01); *G06T 11/20* (2013.01); *G06V 10/25* (2022.01); *G06V 10/764* (2022.01); *G06V 20/64* (2022.01); *G06T 2210/12* (2013.01)

(58) Field of Classification Search
None
See application file for complete search history.

(56) References Cited

U.S. PATENT DOCUMENTS

| | | | |
|---|---|---|---|
| 2018/0254065 A1* | 9/2018 | Chen | G11B 27/34 |
| 2018/0373997 A1* | 12/2018 | Duan | G06N 3/006 |
| 2019/0043003 A1* | 2/2019 | Fisher | G06N 3/04 |

(Continued)

OTHER PUBLICATIONS

Bueno, et al., "Hierarchical Object Detection with Deep Reinforcement Learning," arXiv:1611.03718v2, Nov. 25, 2016 (9 pages).

(Continued)

*Primary Examiner* — Delomia L Gilliard
(74) *Attorney, Agent, or Firm* — McCarter & English, LLP

(57) ABSTRACT

Computer vision systems and methods for object detection with reinforcement learning are provided. The system includes a reinforcement learning agent configured to detect an object pertaining to a target object class and a plurality of objects pertaining to different target object classes, such that the reinforcement learning agent determines a bounding box for each of the detected of objects. The system first sets parameters of the reinforcement learning agent. The system then detects an object and/or objects in an image based on the set parameters. Finally, the system determines a bounding box and/or bounding boxes for each of the detected objects.

22 Claims, 14 Drawing Sheets

(56) References Cited

U.S. PATENT DOCUMENTS

2020/0218888 A1* 7/2020 Gong .................. G06V 40/173
2020/0302294 A1* 9/2020 Kadav .................. G06F 16/783

OTHER PUBLICATIONS

Caicedo, et al., "Active Object Localization with Deep Reinforcement Learning," arXiv:1511.06015v1, Nov. 18, 2015 (9 pages).
Everingham, et al., "The PASCAL Visual Object Classes (VOC) Challenge," International Journal of Computer Vision (2010) (36 pages).
Jie, et al., "Tree-Structured Reinforcement Learning for Sequential Object Localization," arXiv:1703.02710v1, Mar. 8, 2017 (9 pages).
Liu, et al., "SSD: Single Shot Multibox Detector," arXiv:1512.02325v5, Dec. 29, 2016 (17 pages).
Mnih, et al., "Asynchronous Methods for Deep Reinforcement Learning," arXiv:1602.01783v2, Jun. 16, 2016 (19 pages).
Mnih, et al., "Playing Atari with Deep Reinforcement Learning," (2013) https://www.cs.toronto.edu/~vmnih/docs/dqn.pdf (9 pages).
Redmon, et al., "You Only Look Once: Unified, Real-Time Object Detection," arXiv:1506.02640v5, May 9, 2016 (10 pages).
Ren, et al., "Faster R-CNN: Towards Real-Time Object Detection with Region Proposal Networks," arXiv:1506.01497v3, Jan. 6, 2016 (14 pages).
Ren, et al., "Deep Reinforcement Learning-Based Image Captioning with Embedding Reward," arXiv:1704.03899v1, Apr. 12, 2017 (9 pages).
Sutton, et al.,"Reinforcement Learning an Introduction Second Edition" (2018) (548 pages).
Van Hasselt, et al., "Deep Reinforcement Learning with Double Q-Learning," arXiv:1509.06461v3, Dec. 8, 2015 (13 pages).
Williams, "Simple Statistical Gradient-Following Algorithms for Connectionist Reinforcement Learning," Machine Learning (1992) (28 pages).
Xu, "Deep Learning for Object Detection: A Comprehensive Review," Published in Towards Data Science, Sep. 11, 2017 (20 pages).
Yun, et al.,"Action-Decision Networks for Visual Tracking with Deep Reinforcement Learning," IEEE 2017 (10 pages).

* cited by examiner (Prior Art)

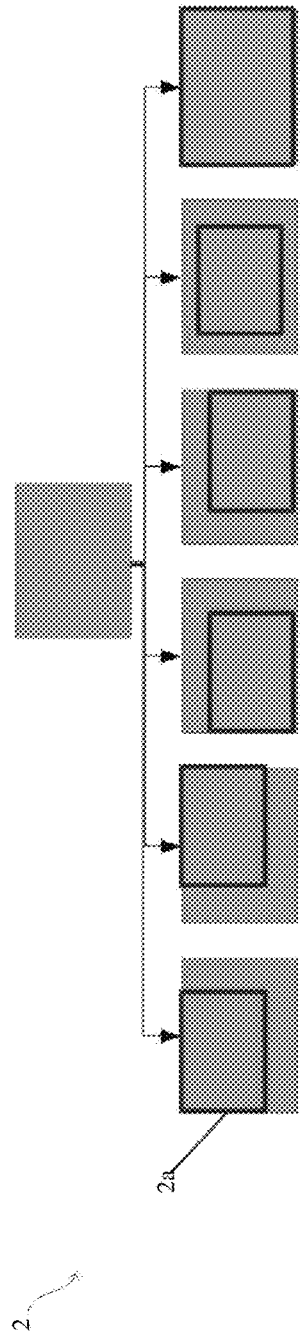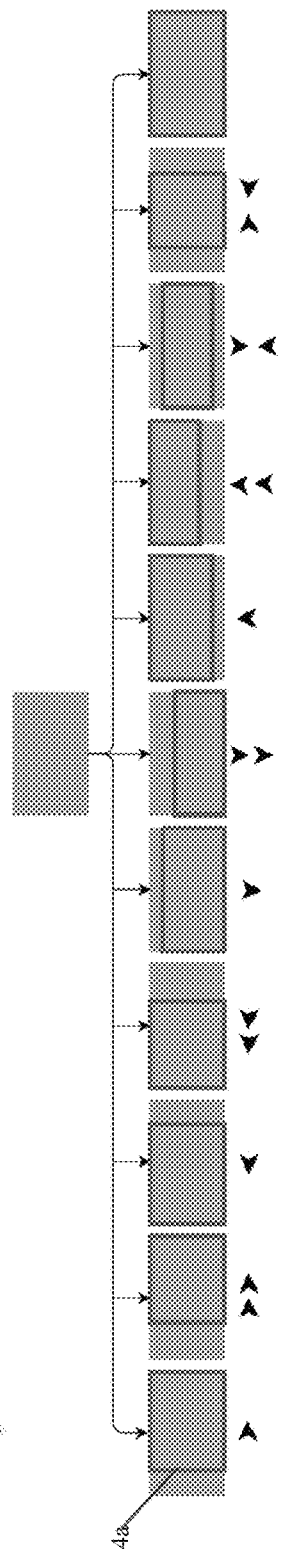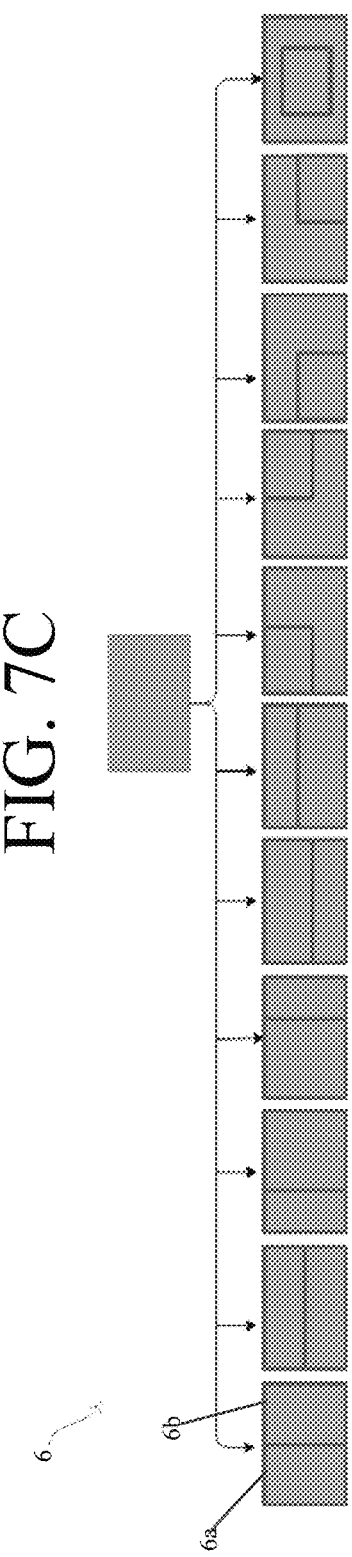

COMPUTER VISION SYSTEMS AND METHODS FOR OBJECT DETECTION WITH REINFORCEMENT LEARNING

BACKGROUND

Technical Field

The present application claims the priority of U.S. Provisional Application Ser. No. 62/948,532 filed Dec. 16, 2019, the entire contents of which are expressly incorporated herein by reference.

Technical Field

The present disclosure relates generally to the field of computer vision technology. More specifically, the present disclosure relates to computer vision systems and methods for object detection with reinforcement learning.

Related Art

Object detection refers to determining a scaled bounding box and identifying a class category for a detected object in an image. Recent approaches have shown that determining a scaled bounding box for an object can be defined as a reinforcement learning problem in which a reinforcement learning agent controls a transformation and scaling of the bounding box. Commencing by evaluating the entirety of an image, the reinforcement learning agent transforms and scales the bounding box until the bounding box encloses the desired object. By interacting with the image, the reinforcement learning agent can determine which areas of the image to focus on and thereby use computational power at relevant portions of the image to achieve higher computational efficiency.

Researchers have focused on different approaches for solving computer vision tasks such as object detection, object tracking, and image captioning with reinforcement learning. These approaches have shown that it is possible for a reinforcement learning agent to detect an object and scale a bounding box for the detected object based on a target object classification. Additionally, multi-object detection is possible by repeatedly executing an algorithm over different portions of an image to create a plurality of bounding boxes. However, these approaches can suffer from duplicative computational efforts when the reinforcement learning agent fails to recognize objects that have previously been detected. The reinforcement learning agent should recognize which objects it has previously detected such that the agent only determines one bounding box per object.

Therefore, there is a need for a computer vision system and method for object detection with reinforcement learning which can address the problem of duplicative computational efforts when the reinforcement learning agent fails to recognize objects that have previously been detected, to thereby improve the ability of the computer vision system to detect and classify an object in an image. Namely, there is a need for a system that can detect an object, a target object class, or a plurality of objects pertaining to different target object classes such that the reinforcement learning agent determines a bounding box for each of the detected objects without requiring a classifier to eliminate false-positives for single and multiple target object classes. Additionally, in the case of multiple target object classes, there is a need for a system that can learn object classes efficiently and provide an object detection solution without returning duplicative search results. These and other needs are addressed by the computer vision systems and methods of the present disclosure.

By way of background and before describing the system and method of the present disclosure in detail, the structure, properties, and functions of conventional prior art object detection systems and methods with reinforcement learning will be discussed first.

A reinforcement learning agent learns how to behave and makes decisions in an unknown environment to solve a task based on a policy. The reinforcement learning agent's goal is to determine a policy that maximizes its performance while balancing between exploration (e.g., performing new actions) and exploitation (e.g., performing actions based on experience and/or feedback). The reinforcement learning agent can perform actions, learn from environmental feedback, and adapt its behavior and decision making processes based on observing its surrounding environment. A reinforcement learning problem can be formalized as a Markov Decision Process (MDP) having a set of possible states $S:=\{s_0, s_1, \ldots, s_n\}$, an initial state $s_0$, a set of possible actions $A:=\{a_0, a_1, \ldots, a_n\}$, a transition model $T(s'|s, a)$ and a reward function $R(s)$.

The reinforcement learning agent's objective is to maximize the expected cumulative discounted return $G_t$, that it receives during the problem-solving process where $G_t$ is defined according to Equation 1.1 as follows:

$$G_t = \sum_{k=0}^{\infty} [\gamma^k R_{t+k+1}] \qquad \text{Equation 1.1}$$

In Equation 1.1, $\gamma$ refers to a discount factor and T refers to the length of an episode. The discount factor $\gamma$ quantifies the amount of consideration the reinforcement learning agent should place on rewards wherein:

$\gamma=0$, signifies that the agent should only consider the immediate reward, $\gamma=1$, signifies that the agent should care equally about future rewards, A value less than 1 is required if the task is not episodic and $T \to \infty$ in formula 1.1 to converge, and A value between $0.9 <= \gamma <= 0.999$ is common.

It is the reinforcement learning agent's goal to learn the optimal policy $\pi^*$ that maximizes $E\pi[Gt]$ wherein:

$$\pi^* = \arg\max_{\pi} \mathbb{E}_{\pi}[G_t]$$

Conventional ways for determining a policy can include: (1) estimating a cumulative expected reward given a state (Value-Function) and an action (Q-Value), with bootstrapping (i.e., updating a value with existing estimates) such that the policy is based on State(-Action)-Values; and (2) performing a complete episode and optimizing the policy directly based on the received reward (e.g., Policy Search and Actor-Critic-Solutions).

Several approaches evaluate states for determining the policy via the value function $V_\pi$ which calculates the expected cumulative reward, beginning at state s, following policy π according to Equation 1.2 below:

$$v_\pi(s) = \mathbb{E}_\pi[G_t \mid S_t = s]$$

$$= \mathbb{E}_\pi\left[\sum_{k=0}^{\infty} \gamma^k R_{t+k+1} \mid S_t = s\right]$$

$$= \mathbb{E}_\pi\left[R_{t+1} + \gamma \sum_{k=0}^{\infty} \gamma^k R_{t+k+2} \mid S_t = s\right]$$

$$= \sum_a \pi(a \mid s) \sum_{s'} \sum_r p(s', r \mid s, a)$$

$$\left[r + \gamma \mathbb{E}_\pi\left[\sum_{k=0}^{\infty} \gamma^k R_{t+k+2} \mid S_{t+1} = s'\right]\right]$$

$$= \sum_a \pi(a \mid s) \sum_{s',r} p(s', r \mid s, a)[r + \gamma v_\pi(s')].$$

Equation 1.2

In value based approaches the reinforcement learning agent is trained to learn the expected reward of a state or state-action pair and to utilize the expected reward to select an action. In a policy search approach, the reinforcement learning agent is trained to learn the policy instead of utilizing an implicit policy that is based on a learned value or Q-function. Therefore, a parametrized policy can be considered which does not require a value function. The objective is to maximize the expected reward of the policy function by finding an adequate parameter θ which denotes the policy parameter vector. This is known as an Optimization Problem which can be solved by gradient methods (e.g., gradient descent) or gradient free methods (e.g., Hill Climbing or genetic algorithms).

In a Policy Gradient, updating weights following a performance measurement of π(θ): J(θ) is given by Equation 1.3:

$$\theta_{t+1} = \theta_t + \alpha \widehat{\nabla J(\theta_t)}$$

Equation 1.3 such that with the approximation of the gradient, it could be shown that: wherein, as a consequence, the update rule 1.3 is defined as:

$$\nabla_\theta J(\theta) = \sum_{t=0}^{T-1} \nabla_\theta \log \pi_\theta(a_t \mid s_t) G_t$$

$$\theta_{t+1} = \theta_t + \alpha \sum_{t=0}^{T-1} \nabla_\theta \log \pi_\theta(a_t \mid s_t) G_t$$

The algorithm that follows the update rule 1.3 is called "Reinforce." The update is incremented in the direction of the gradient weighted by the return Gt (higher returns more readily influence parameters) which is divided by the probability of selecting this action. The division ensures that frequently utilized actions do not have an advantage. The update rule 1.5 is only defined for episodic cases because the return Gt (the sum of all future rewards) is only defined for finite episodes. Table 1 below illustrates the algorithm performed according to the Reinforce update rule 1.5 and the Monte Carlo Policy Gradient for an episodic case.

TABLE 1

Algorithm 1: REINFORCE/Monte Carlo
Policy Gradient(Episodic case)

Input:parameterized policy π with parameter θ,learning rate α.
Initialize policy parameters θ.
repeat
    Generate an episode using π.
    Policy Update:For each pair $s_t$, $a_t$ appearing in the episode.
        $G_t$ = discounted sum of rewards with discount factor γ.
        θ = θ + α $G_t$ $\nabla_\theta$ log($\pi_\theta(a_t|s_t)$)
until converges Value based approaches and policy search approaches have their respective advantages and disadvantages. A policy search could approach a deterministic gradient while a value based approach always has an E-probability of selecting a random action. A policy search can handle a stochastic policy whereas a value based approach is not designed to find a stochastic policy. Additionally, because the Policy Gradient is a Monte Carlo Method, it has a high variance and therefore yields slow learning.

In a policy search it is possible to add a baseline which can reduce the variance as long as it does not depend on actions because the subtracted part is zero in the gradient according to Equation 1.4:

$$\nabla_\theta J(\theta) = \mathbb{E}\left[\sum_{t=0}^{T-1} \nabla_\theta \log \pi_\theta(a_t \mid s_t)(G_t - b(s_t))\right]$$

Equation 1.4

A common choice for the baseline value is the value function v(s) with weight vector w such that Equation 1.4 could be updated with $w \leftarrow w + \alpha_w \gamma^1 (G_t - v(s, w))\nabla v(s, w)$.

The Actor-Critic approach combines the Policy Gradient concept with a baseline and Temporal-Difference learning to utilize an estimated value of a subsequent state. The policy is called the "actor" because the policy decides which action to perform and the value function is called the "critic" because it criticizes or rates the chosen action. As such, the policy and the value function can learn explicit stochastic policies and are able to handle continuous action space, similar to a policy gradient, according to Equation 1.5:

$w = w + \alpha_w (r_{t+1} + \gamma v_w(s+1) - v_w(s_t)) \nabla w\, v_w(s_t)$  $\theta = \theta + \alpha_\theta$
$(r_{t+1} + \gamma v_w(s+1) - v_w(s_t)) \nabla_\theta \log(\pi_\theta(a_t|s_t))$   Equation 1.5

Table 2 below illustrates the algorithm performed according to the Actor-Critic approach.

TABLE 2

Algorithm 2: Actor Critic

Input:parameterized policy π with parameter θ,learning rate $\alpha_\theta$.
parameterized policy v with parameter w,learning rate $\alpha_w$.
Initialize policy parameters θ and value function parameter w.
t = 0
repeat
    $s_0$ = initial state.
    repeat
        Choose action a according to $\pi_\theta(s_t)$.
        Observe $s_{t+1}$, $r_{t+1}$
        θ = θ + $\alpha_\theta(r_{t+1}+\gamma v_w(s+1) - v_w(s_t))$ $\nabla_\theta$ log($\pi_\theta(a_t|s_t)$)
        w = w + $\alpha_w$ $(r_{t+1}+\gamma v_w(s+1) - v_w(s_t))$ $\nabla_w$ $v_w(s_t)$)
        t = t + 1
    until $s_{t+1}$ is terminal
until converges If the model of the environment is known, an algorithm is aware of the actions that can lead to particular states and can utilize the value function to determine the best value function. If the model of the environment is unknown, these two functions cannot be determined. However, a neural network can be used to approximate the Q-function according to Equation 1.6:

$$Q_u(s_t, a_t) = \mathbb{E}_\pi [r_{t+1} + \gamma V_\pi(s_{t+1})] \qquad \text{Equation 1.6}$$

Another type of policy is the Asynchronous Advantage Actor Critic (A3C). The A3C calculates a value estimation (i.e., critic) and a policy update (i.e., actor) which are each represented by separate and fully connected layers. In A3C, multiple reinforcement learning agents simultaneously interact with their environments independent from other environments. All reinforcement learning agents have their own network parameters but share a global network. As such, the utilization of multiple reinforcement learning agents allows for receiving more diverse data.

Object detection with reinforcement learning can be performed by several different approaches including, but not limited to, active object localization, hierarchal object detection, sequential multi-object localization and tree-structured reinforcement learning for sequential object localization.

In active object localization, a state pertains to a currently chosen region (i.e., a feature vector of the current region) and a history of selected actions pertaining to the chosen region. In particular, a feature vector o is extracted from the current region by utilizing a pre-trained CNN. Additionally, any attended region by the reinforcement learning agent is adjusted to match the input of the network (e.g., 224×224) irrespective of its size and aspect ratio. Accordingly, a 4,096 dimensional feature vector is generated to represent the content of the current region. The history vector encodes 10 past actions wherein each past action of the history vector is represented by a <number of actions>—a dimensional binary vector.

During processing, a bounding box (given as b=$x_1, y_1, x_2, y_2$) is discretely transformed according to the selected action with scale factors $a_w = \alpha(x_2 - x_1)$, $a_h = \alpha(y_2 - y_1)$. For example, to select an action to laterally move a bounding box to the right would be represented as $x_1 = \alpha_w + x_1$, $x_2 = \alpha_w + x_2$. The reinforcement learning agent receives positive and negative rewards for each transformation decision (r ∈ {−1, 1}) to reflect the improvement the reinforcement learning agent makes in localizing an object after selecting a particular action. A reward is measured utilizing the IoU between the target object and the predicted bounding box according to Equations 1.7 and 1.8:

$$IoU(b, g) = \frac{\text{area}(b \cup g)}{\text{area}(b \cap g)} \qquad \text{Equation 1.7}$$

$$R(s, s') = \text{sign}(IoU(b', g) - IoU(b, g)) \qquad \text{Equation 1.8}$$

wherein s denotes the last state, s' denotes the current state, g denotes the ground truth box, b denotes the last bounding box, and b' denotes the current bounding box. The reinforcement learning agent can also receive a special award for a trigger according to Equation 1.9:

$$R(s, s') = \begin{cases} +\eta & \text{if } IoU(b, g) \geq \tau \\ -\eta & \text{otherwise} \end{cases} \qquad \text{Equation 1.9}$$

FIGS. 1-2 are diagrams illustrating prior art hierarchical object detection processing with deep reinforcement learning. The objective of hierarchical object detection is to identify an accurate location of a target object in space. During processing, an algorithm determines which regions to focus on and magnify (i.e., zoom in) and as such, objects can be detected with very few proposals from an appropriate hierarchy.

In hierarchical object detection, a state comprises a descriptor of a current region and a history vector $d_t$. The descriptor of the current region can include visual features extracted by a CNN and the history vector $d_t$ comprises the past four selected actions. The actions include bounding box deformations (e.g., top-down movements) or a terminal state (i.e., a trigger). The reward is as described above in relation to active object localization with deep reinforcement learning.

As shown in FIG. 2, two models for executing hierarchical object detection include, but are not limited to, Image-Zoom and Pool45-Crops, each of which extract a 7×7 feature map. The feature map and the history vector are processed by the Deep Q-Network comprising two fully connected layers followed by a rectified linear unit (ReLU) wherein the ReLU is trained with dropout. A drawback of this approach is that only one object per image is localized and therefore hierarchical object detection does not provide for multiple object detection.

FIG. 3 is a diagram illustrating prior art sequential multi-object localization processing. The features of each of the current window and the entirety of the image are extracted utilizing VGG-16 layer CNN model pre-trained on ImageNet. As shown in FIG. 3, to accelerate feature extraction, the feature vectors are computed on top of pre-computed feature maps of the layer "conv5_3" after using the ROI Pooling operation to obtain a fixed-length feature representation of the specific windows.

FIGS. 4-6 are diagrams illustrating prior art tree-structured reinforcement learning for sequential object localization processing. The objective of tree-structured reinforcement learning for sequential object localization is to localize multiple objects in a single run commencing with an evaluation of the whole image. During processing, an algorithm performs every step on one scale and one transformation action such that every step yields two new candidates.

In tree-structured reinforcement learning for sequential object localization, a state comprises a descriptor of a current region and a history vector $d_t$. The descriptor of the current region can include visual features extracted by a CNN and the history vector $d_t$ comprises the past four selected actions. As shown in FIGS. 4-6, the actions can include scaling and local translations across at least 2-4 levels. The reward is determined by utilizing the IoU between any target object $g_i$ and the predicted box b according to Equation 2.0:

$$R(s, s') = \max_i \; \text{sign}(IoU(b', g) - IoU(b, g)) \qquad \text{Equation 2.0}$$

wherein s denotes the last state, s' denotes the current state, g denotes the ground truth box, b denotes the last bounding box, and b' denotes the current bounding box. The reinforcement learning agent can also receive a special reward for covering more than half of a ground-truth object for the first time according to Equation 2.1:

$$R(s, s') = \begin{cases} +5 & \text{cover half of } g_i \text{ first time} \\ \max_i \text{ sign}(IoU(b', g) - IoU(b, g)) & \text{otherwise} \end{cases} \qquad \text{Equation 2.1}$$

Tree-structured reinforcement learning for sequential object localization provides for determining a fixed number of proposals for one image. A user must define the number of proposals. A drawback of this approach is the reliance on a classifier after the generation of the fixed number of proposals.

As such, there is a need for a system that can detect an object, a target object class, or a plurality of objects pertaining to different target object classes such that the reinforcement learning agent determines a bounding box for each of the detected objects without requiring a classifier to eliminate false-positives for single and multiple target object classes. Additionally, in the case of multiple target object classes, there is a need for a system that can learn object classes efficiently and provide an object detection solution without returning duplicative search results. These and other needs are addressed by the computer vision systems and methods of the present disclosure.

SUMMARY

The present disclosure relates to computer vision systems and methods for object detection with reinforcement learning. Specifically, the system includes a reinforcement learning agent configured to detect an object pertaining to a target object class and a plurality of objects pertaining to different target object classes, such that the reinforcement learning agent determines a bounding box for each of the detected of objects. The system first sets parameters of the reinforcement learning agent. The system then detects an object and/or objects in an image based on the set parameters. Finally, the system determines a bounding box and/or bounding boxes for each of the detected objects.

BRIEF DESCRIPTION OF THE DRAWINGS

The foregoing features of the invention will be apparent from the following Detailed Description of the Invention, taken in connection with the accompanying drawings, in which:

FIGS. 7A-C are diagrams illustrating hierarchical object detection processing performed by the system of the present disclosure;

DETAILED DESCRIPTION

Figure 1:
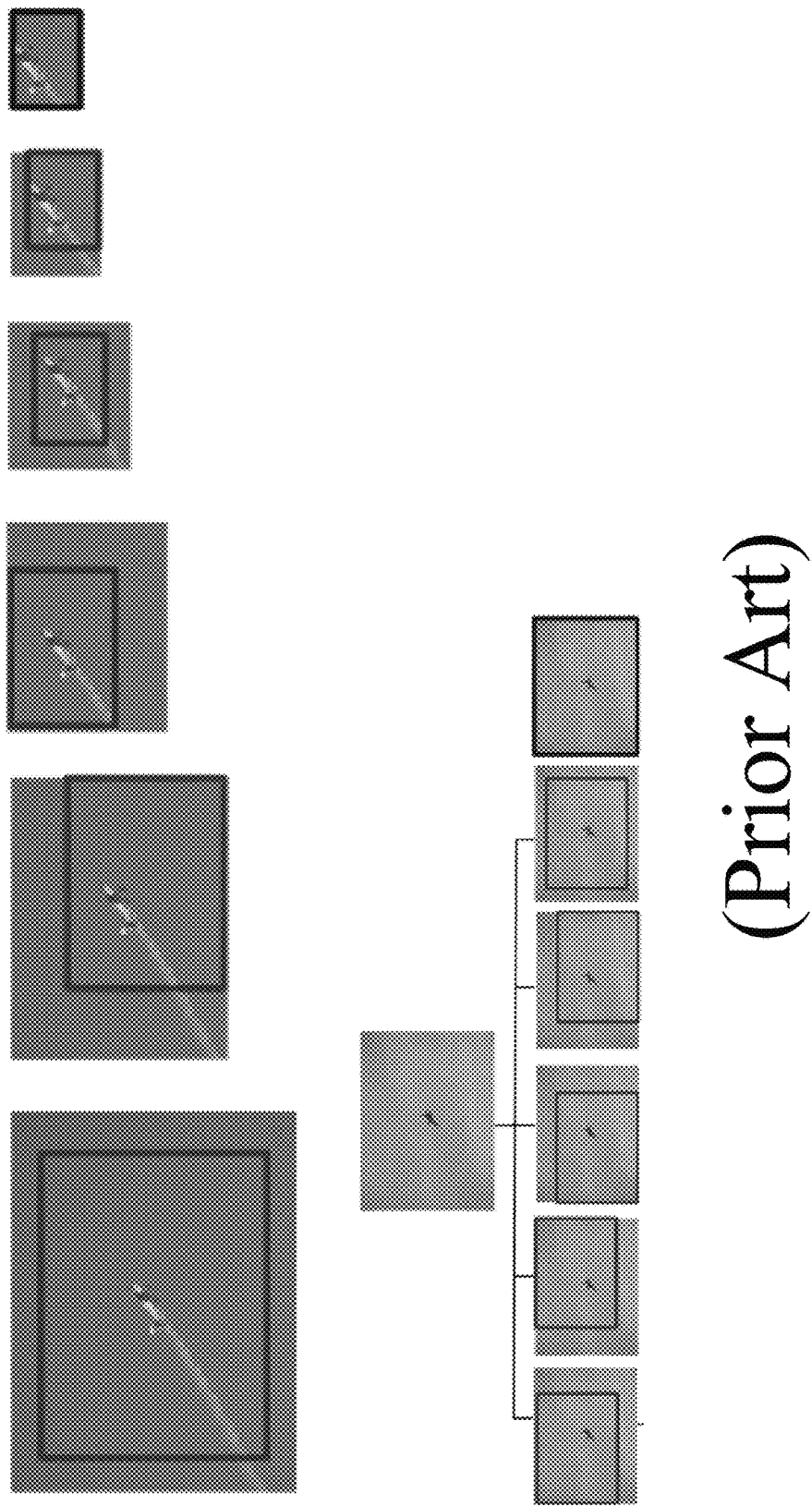
FIGS. 1-2 are diagrams illustrating prior art hierarchical object detection processing with deep reinforcement learning.
Figure 2:
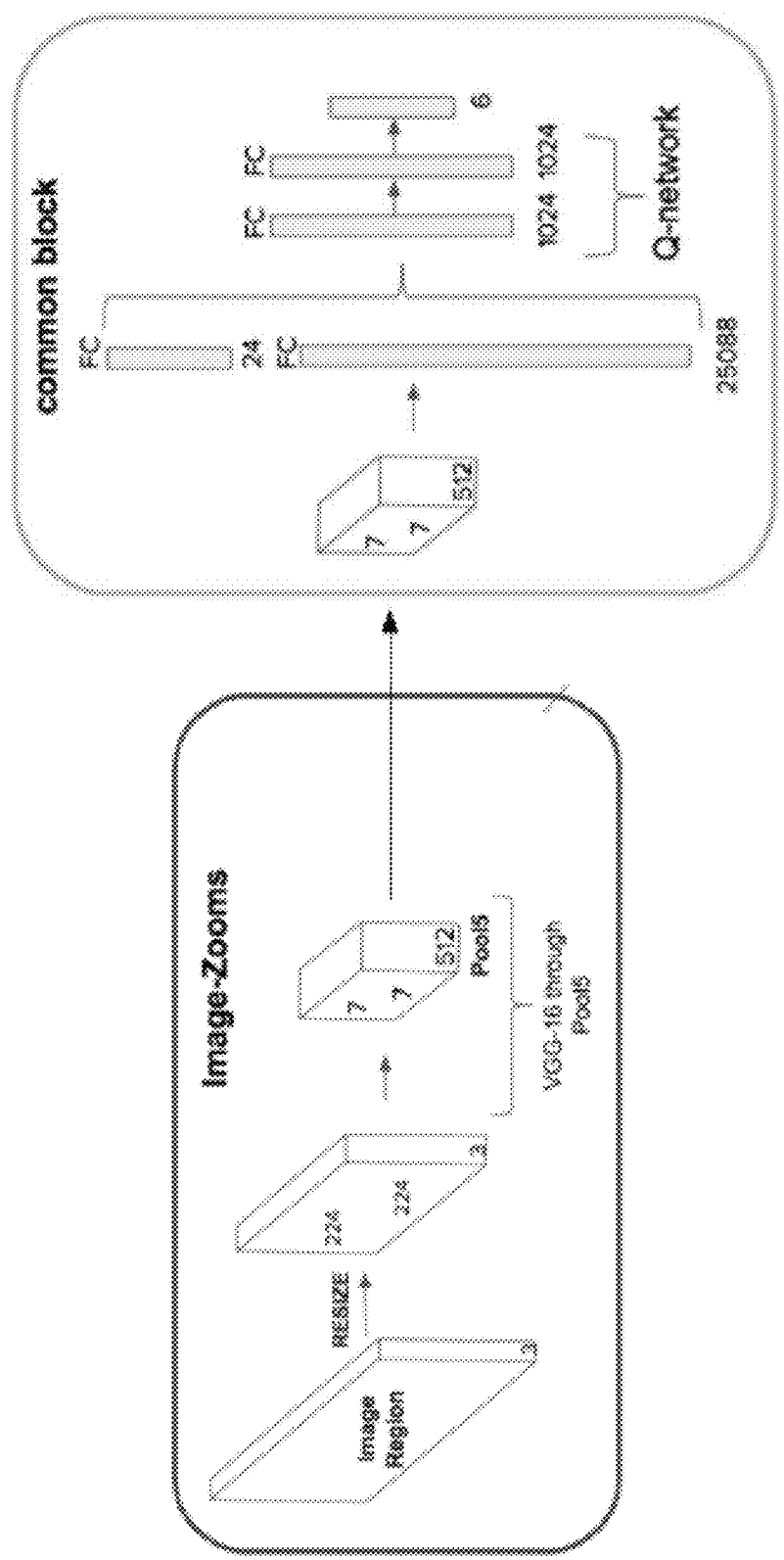
Figure 3:
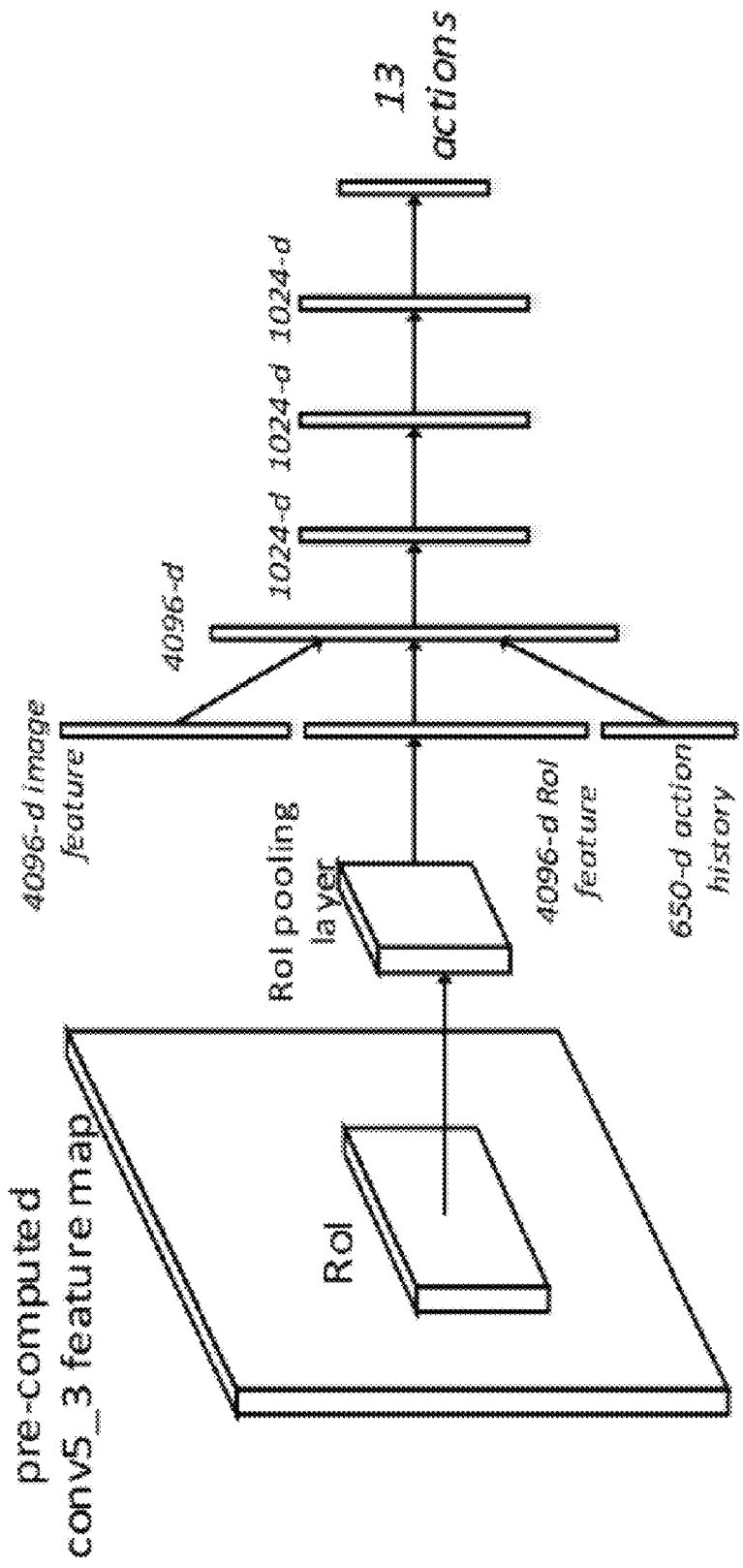
FIG. 3 is a diagram illustrating prior art sequential multi-object localization processing.
Figure 4:
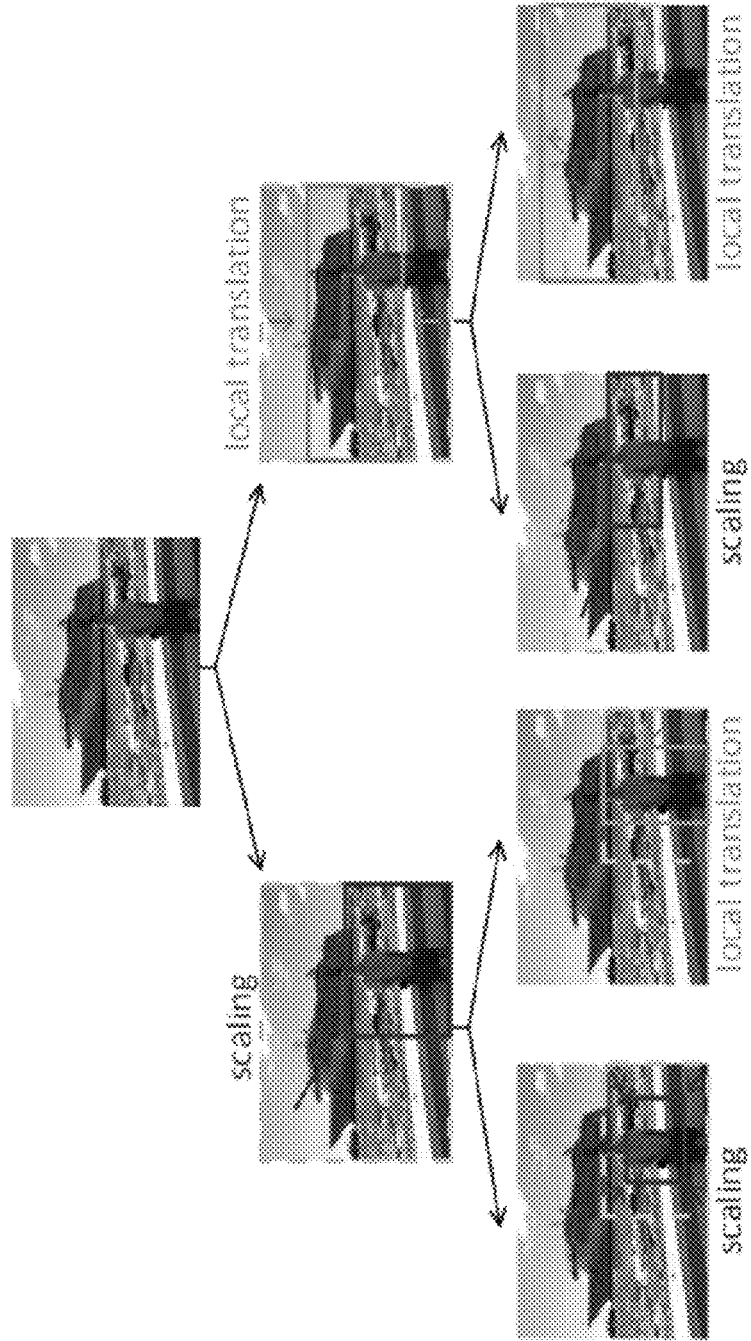
FIGS. 4-6 are diagrams illustrating prior art tree-structured reinforcement learning for sequential object localization processing.
Figure 5:
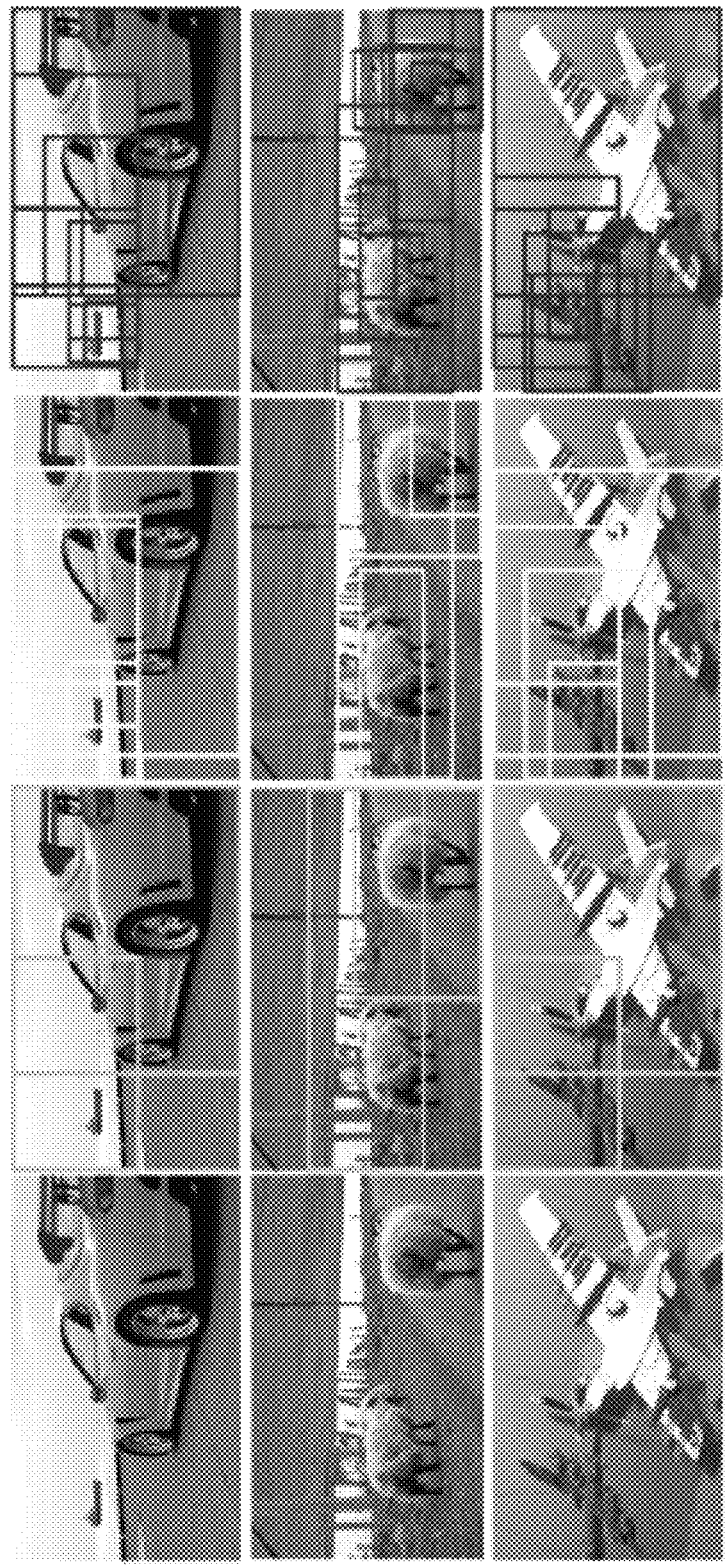
Figure 6:
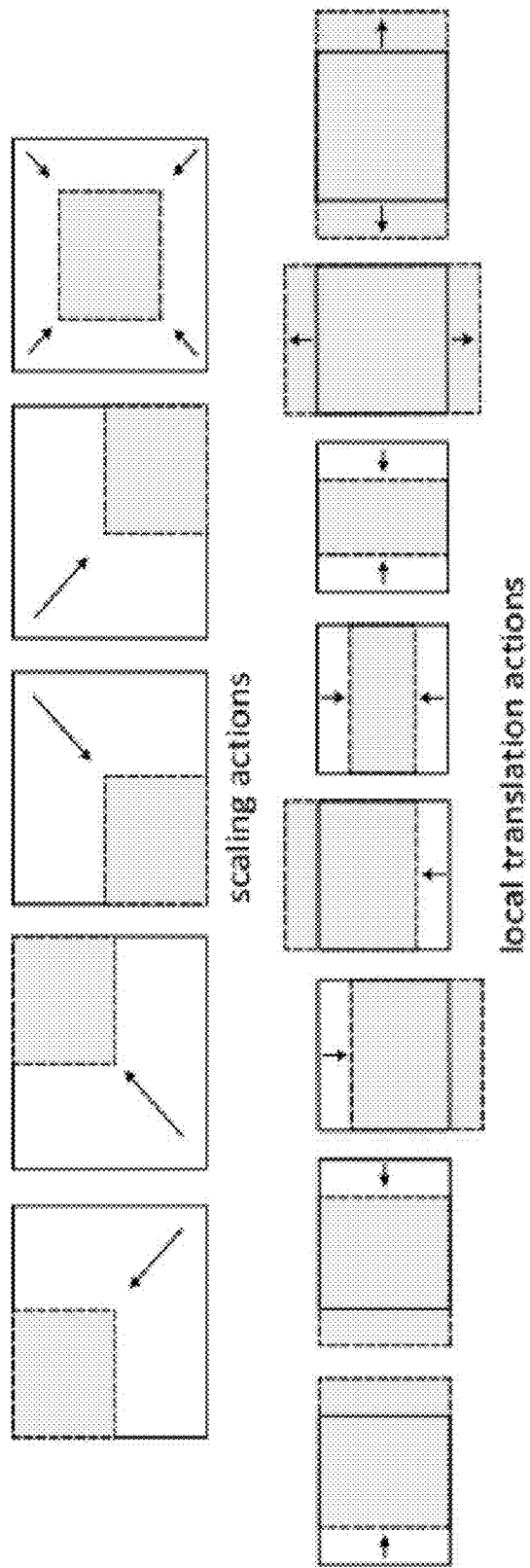

The present disclosure relates to a computer vision system and method for object and multi-object detection with reinforcement learning, as described in detail below in connection with FIGS. 1-13.

The system of the present disclosure extends the features and capabilities of the hierarchical object detection approach as discussed above in relation to FIG. 1 to provide for object detection and multi-object detection. For example, the system of the present disclosure utilizes different sets of actions, algorithms, and reward models to provide for object detection and multi-object detection with reinforcement learning.

In the system, actions can include, but are not limited to, a combination of the localization and magnification actions 2 as shown in FIG. 7A and the top-down actions 4 as shown in FIG. 7B in addition to the splitting actions 6 as shown in FIG. 7C. The magnification actions 2 provide for magnifying a specific portion of an image where an object has been detected. The learning agent can magnify the detected object by shifting a bounding box 2a left, right, up or down within the image. Additionally, the learning agent can center the bounding box 2a within the image or magnify the entire image by expanding the bounding box 2a to encompass the entire image. The top-down actions 4 provide for shifting a bounding box 4a to a specific portion of an image where an object has been detected by adjusting a size of the bounding box 4a. The learning agent can shift the bounding box 4a by compressing a left side, a right side, a top, and/or a bottom of the bounding box 4a. Alternatively, the learning agent can shift the bounding box 4a by expanding the left side, the right side, the top, and/or the bottom of the bounding box 4a. The splitting actions 6 provide for splitting a bounding box into at least two bounding boxes 6a and 6b when the reinforcement learning agent detects more than one object in a current region of an image.

All possible actions can decrease an image size (except a terminal action) while providing the reinforcement learning agent with the ability to select an aspect ratio and size of a region. It should be noted that continuous actions can also be utilized when using Actor Critic or Policy Gradient methods. It should also be noted that the variety of actions can complicate the processing of the reinforcement learning agent. The actions can be analyzed with regard to the average steps of the reinforcement learning agent, the best fitting bounding boxes and a capability of the reinforcement learning agent to learn the actions (i.e., network complexity).

As shown in FIG. 7C, when the reinforcement learning agent detects more than one object in a current region, the agent can select a split action to split the region as necessary.

If regions overlap, the smaller region is processed and the larger region is converted or provided to the reinforcement learning agent for further processing. The system of the present disclosure can also provide for the reinforcement learning agent to select an action that opposes a top-down action (e.g., a left or right lateral move) since a splitting action can restrict potential regions. An opposing action can be integrated in a trigger action to ensure it is only utilized once.

The reinforcement learning agent can be trained with single class object categories and multiple class object categories to determine bounding boxes. A classification step is not required if only a single class object is detected. A reinforcement learning agent can learn to press a trigger-action for each class category if multiple class objects are detected. Alternatively, classification can be performed in an independent step.

Whereas previous approaches utilize Deep-Q-Learning, the system of the present disclosure can utilize other approaches including, but not limited to, Asynchronous Advantage Actor Critic and the Monte Carlo method. The system of the present disclosure can also utilize different reward models including, but not limited to, determining a reward utilizing the IoU between the target object and the predicted bounding box according to Equations 2.2 and 2.3 and determining a special reward for a trigger action according to Equation 2.4 as described above. Additional rewards can include a reward for a higher decrease of a region size and a reward for determining a target IoU.

Figure 7D:
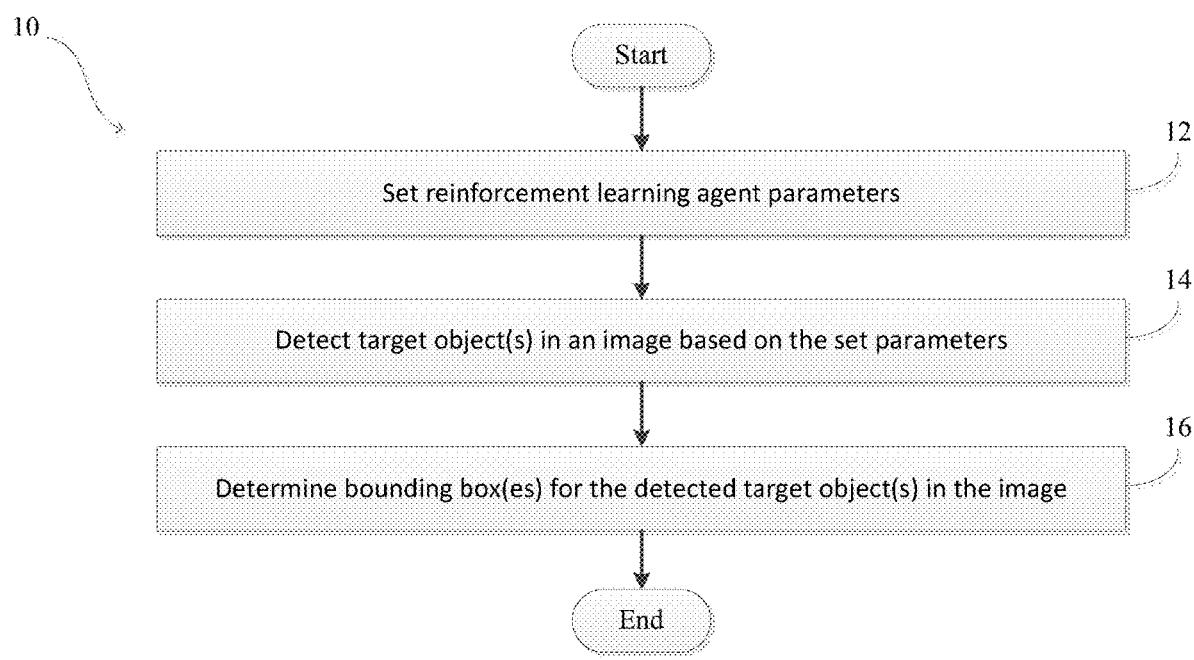
FIG. 7D is a flowchart illustrating overall process steps carried out by the system of the present disclosure.

FIG. 7D is a flowchart illustrating overall process steps carried out by the system of the present disclosure, indicated generally at method 10. The system includes a reinforcement learning agent configured to detect an object pertaining to a target object class and a plurality of objects pertaining to different target object classes, such that the reinforcement learning agent determines a bounding box for each of the detected of objects. In step 12, the system sets the parameters of the reinforcement learning agent. Then, in step 14, the system detects an object and/or objects in an image based on the set parameters. Lastly, in step 16, the system determines a bounding box and/or bounding boxes for each of the detected objects.

Figure 8:
FIG. 8 depicts an image data set processed by the system of the present disclosure.

Testing of the system of the present disclosure will now be discussed in relation to FIGS. 8-12. FIG. 8 depicts an image data set utilized in the testing of the system and FIGS. 9 to 12 are graphs illustrating results of test runs of the system performed with different action set values, with and without history vectors, with different terminal rewards, and with different IoU thresholds.

By way of example, the system utilizes datasets of the Pascal Visual Object Classes (VOC) challenge. It should be noted that any dataset can be used. The system utilizes the 2007 and 2012 VOC datasets for the training of the reinforcement learning agent and the 2007 VOC test set for the evaluation thereof. The Pascal dataset includes 20 classes comprising the following: an airplane, a bicycle, a boat, a bottle, a bus, a car, a cat, a chair, a cow, a dining table, a dog, a horse, a motorbike, a person, a potted plant, sheep, a train and a television. The size of the 2007 VOC dataset includes 90-2,000 images per class and comprises 5,011 images and 12,608 annotated objects. The size of the 2012 VOC dataset includes 300-4,000 images per class and comprises 11,540 images and 27,450 annotated objects. The VOC datasets provide object annotations including class (e.g, the object class—car or bicycle), bounding box (an axis-aligned rectangle specifying an extent of the object visible in the image), view (e.g., frontal, rear, left or right), truncated and difficult.

A view annotation is provided for a majority of objects but some objects may not have a specified view. An object marked as truncated indicates that the bounding box specified for the object does not correspond to a full extent of the object (e.g., an image of a person from the waist up). An object marked as difficult indicates that the object is considered difficult to recognize.

The evaluation method of the system of the present disclosure is based on the standard evaluation methods of the VOC Challenge but implements multiple thresholds. The bounding boxes (bb) and ground-truth (gt) boxes are categorized as a correctly detected object based on their overlap with the ground-truth. In particular, an object is correctly detected if IoU>iou-threshold wherein the iou-threshold={0.5, 0.7, 0.9}. In the case of single object detection, it is defined that there is only one ground-truth box in the image (e.g., the ground-truth box with the highest IoU). As such, the parameters of the evaluation method include, but are not limited to, the following:

True positive (TP): Every bb where IoU (bb, gt)>iou-threshold (the algorithm has correctly detected the object);

False positive (FP): Every bb where IoU (bb, gt)<iou-threshold (the algorithm has detected an object having no gt);

False negative (FN): Every gt where IoU (bb, gt)<iou-threshold (the algorithm did not detect a gt object); and True negative (TN): Not defined.

The performance of the system algorithm is measured by Recall and Precision. Recall is the TP rate (e.g., the amount of gt-boxes detected) and Precision is the TN rate (e.g., the amount of bounding boxes that cover gt). Recall and Precision are defined according to Equation 2.2 as follows:

$$\text{Recall} = \frac{TP}{TP+FN}, \text{Precision} = \frac{TP}{TP+FP} \quad \text{Equation 2.2}$$

It is noted that a Precision-Recall-Curve or AP cannot be calculated based on different recall values because the output of the reinforcement learning algorithm is not tied to a confidence value and a comparable value of this algorithm is unavailable.

The system of the present disclosure evaluates how an environment and agent choices affect the learning capability of the reinforcement learning agent. For example, the system can change and extend a set of actions to determine whether the agent can achieve more realistic bounding boxes. Such changes and extensions can include, but are not limited to, cutting ¼ of a side of an image, cutting ⅕ and ⅓ of each side action which allow the agent to improve processing speed by cropping a smaller portion of the image while simultaneously improving processing accuracy by cropping larger portions of the image, and a mixture of actions traditionally utilized in hierarchal object detection.

Figure 9:
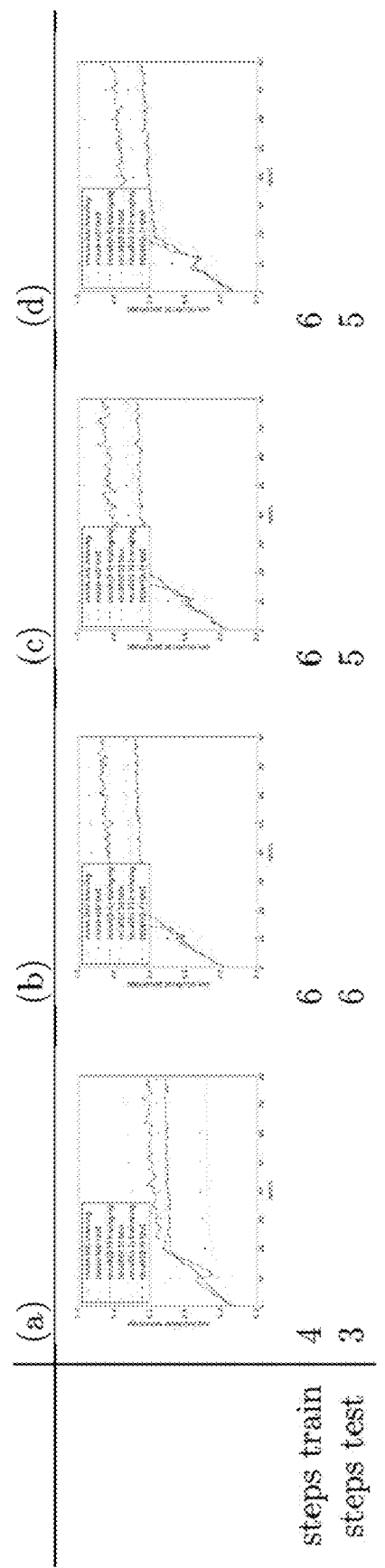
FIG. 9 is a graph illustrating results of test runs of the system of the present disclosure performed with different action set values.

FIG. 9 is a graph illustrating results of test runs of the system performed with the different action set values. For example, reference indicator (a) illustrates an action set from hierarchal object detection, reference indicator (b) illustrates cut actions, reference indicator (c) illustrates fastcut actions and reference indicator (d) illustrates a mixture of actions. As shown in FIG. 9, the changed and extended action sets provide for an improved learning capability of the reinforcement learning agent within a reasonable number of steps.

In conventional systems, points were previously chosen according to a final reward ∈ {3, −3} depending on IoU (bb, gt)>0.5 or else reward ∈ {1, −1} depending on whether IoU had improved. When different size scaling actions are present, the "stronger" scaling actions receive a higher reward ∈ {3, −3} so that these actions have an advantage over "normal" scaling actions. If not, the agent can receive a higher reward by selecting two smaller steps in lieu of one larger step.

Figure 10:
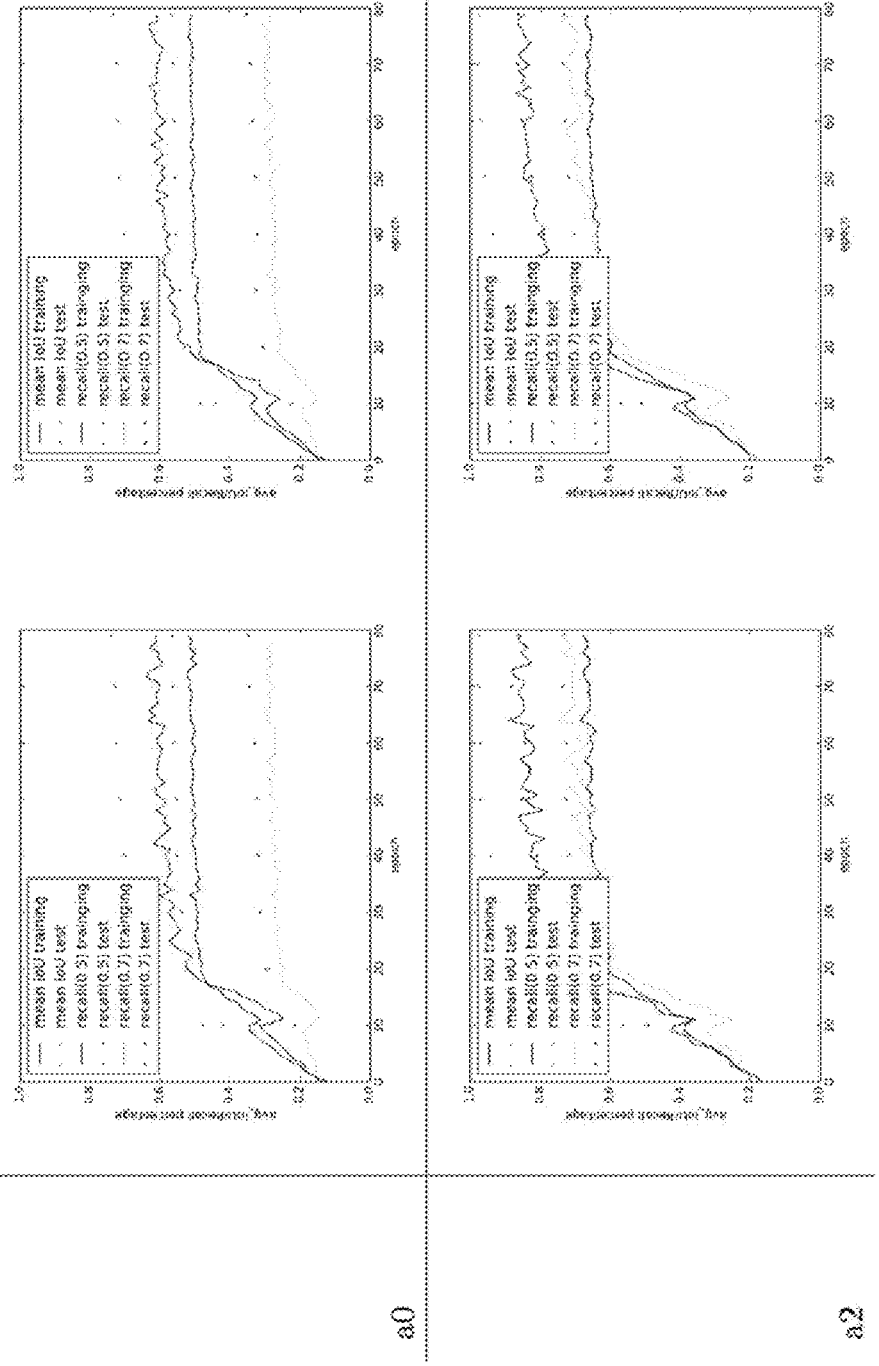
FIG. 10 is a graph illustrating results of test runs of the system of the present disclosure performed with and without history vectors.

The optimal behavior for a reinforcement learning agent is to determine the best fitting bounding box on the portion of the image received as the input which is independent of the reinforcement learning agent's previous selected actions. In previous approaches, the reinforcement learning agent receives information relating to previously selected actions. The system of the present disclosure evaluates whether this input information is necessary and improves the performance of the reinforcement learning agent. For example, FIG. 10 is a graph illustrating results of test runs of the system performed with and without history vectors. As shown in FIG. 10, removal of the history vector does not affect the performance of the reinforcement learning agent.

As discussed above, the optimal behavior for a reinforcement learning agent is to determine the best fitting bounding box for an object. The reward for an action defines the optimization problem. As such, how the reward is defined can change the optimization problem. Therefore, the reward must be defined carefully. Currently, the reinforcement learning agent receives a positive reward for every "good" step with an extra "high" reward for a successful final step. The optimal number of rewards the reinforcement learning agent can receive is dependent on selecting all actions that improve IoU such that the next selected step would yield a deterioration in performance in which case a terminal action is selected. This is still true if the terminal action does not have a higher reward.

Figure 11:
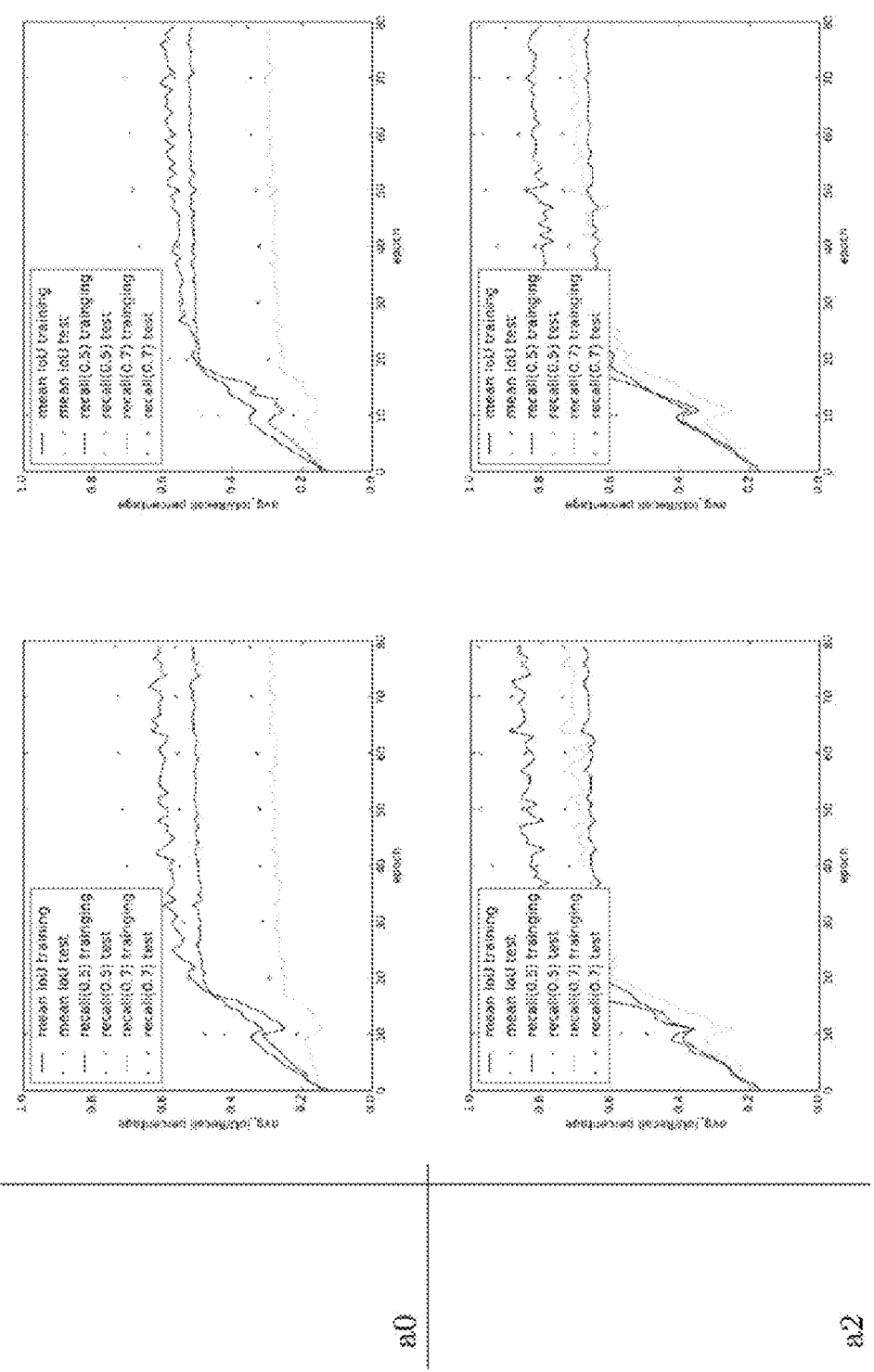
FIG. 11 is a graph illustrating results of test runs of the system of the present disclosure performed with different terminal rewards.

The system of the present disclosure evaluates whether the optimal number of rewards can be improved and a better fitting bounding box can be determined when the reinforcement learning agent receives a positive terminal reward only if IoU>0.7. For example, FIG. 11 is a graph illustrating results of test runs of the system performed with different terminal rewards.

The above discussed approaches of the system of the present disclosure can be extended to realize multi-object detection where a reinforcement learning agent independently determines an amount of bb to search. For example, sequential and splitting approaches can realize multi-object detection. In the sequential approach, the reinforcement learning agent can utilize a final trigger action indicating an object is not present. For example, the reinforcement learning agent may search for objects and blur the objects upon detection so the objects are not repeatedly detected. To prevent blurring of other objects by an overlapping blurred object, the reinforcement learning agent can search for smaller objects before searching for larger objects.

The system of the present disclosure also evaluates an implementation of rewards for the reinforcement learning agent. The environment maintains a list of current regions in addition to the IoU of every region with all current regions. The regions are processed sequentially wherein the last element is processed first. The reinforcement learning agent selects the last element from the list (pop( )) for processing via a scaling action or a splitting action. If the reinforcement learning agent selects a scaling action, the reinforcement learning agent changes a size of the region and appends it again to the list. The reward is positive if the IoU for all objects in this region improve. It should be noted that the amount of the reward is relative to the scaling size.

Figure 12:
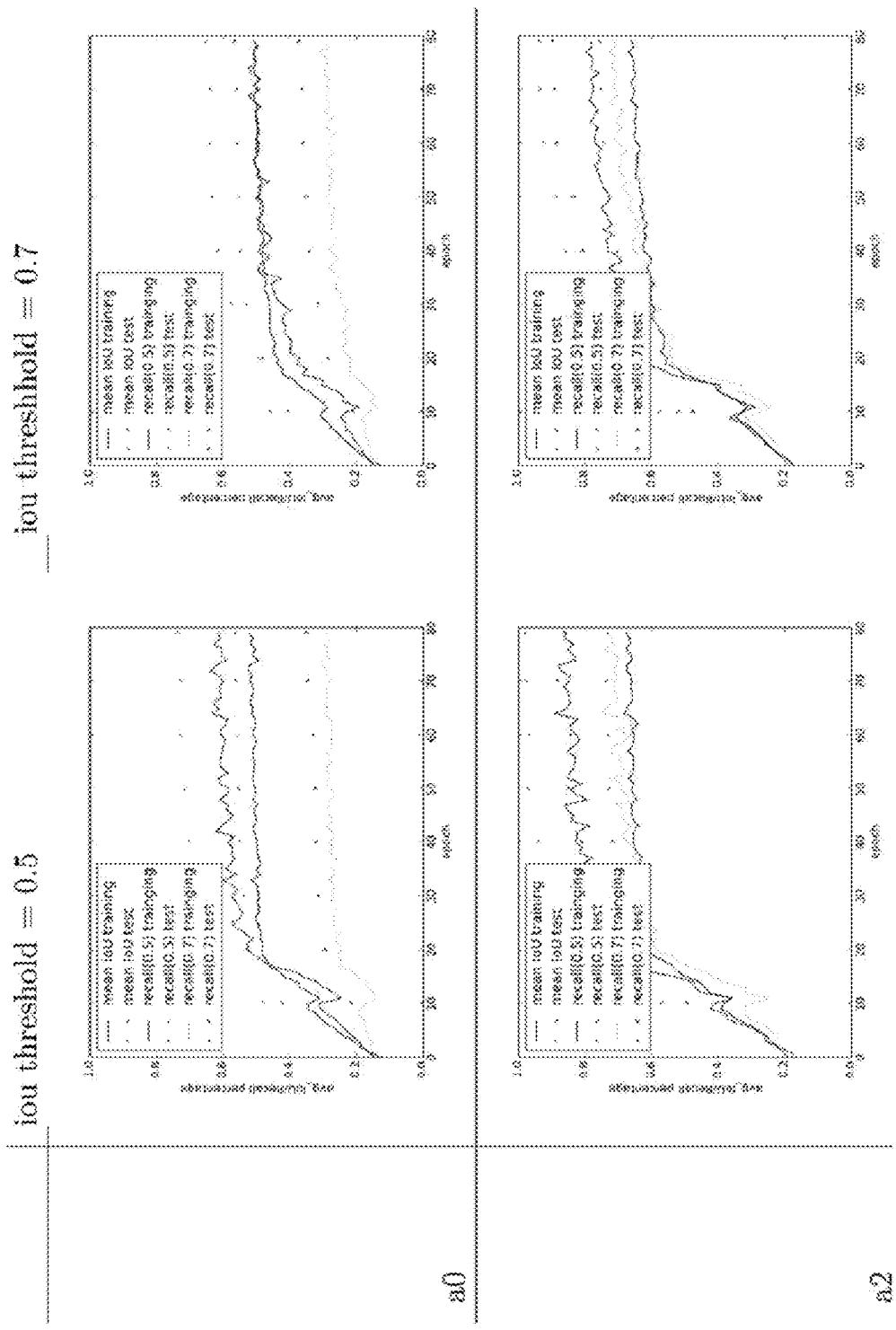
FIG. 12 is a graph illustrating results of test runs of the system of the present disclosure performed with different intersection-over-union (IoU) thresholds.

If the reinforcement learning agent selects a splitting action, two regions are generated. If the two generated regions overlap, the small region is processed first and appended to the list. The system determines, for all objects present in the previous region, the IoU and a coverage amount of the objects in each of the two generated regions. The reward is positive if each region contains an object having coverage of more than 0.5. Different values of object coverage (e.g., 0.75) can also be utilized. FIG. 12 is a graph illustrating results of test runs of the system performed with different IoU thresholds.

As discussed above, the object of the reinforcement learning agent is to detect objects present in an image. An object is detected if an IoU with ground-truth is higher than 0.5. The reinforcement learning agent can receive a positive reward $r_{terminal}$ if the agent detects an object and can receive a penalty $p_{terminal}$ if the agent does not detect an object. To guide the reinforcement learning agent and improve processing speed, the reinforcement learning agent can receive additional positive rewards for selecting "good" actions and can receive additional penalties for selecting "bad" actions. For example, if the reinforcement learning agent scales the image, the agent receives a positive reward r scale if the IoU with the ground-truth is improved.

Figure 13:
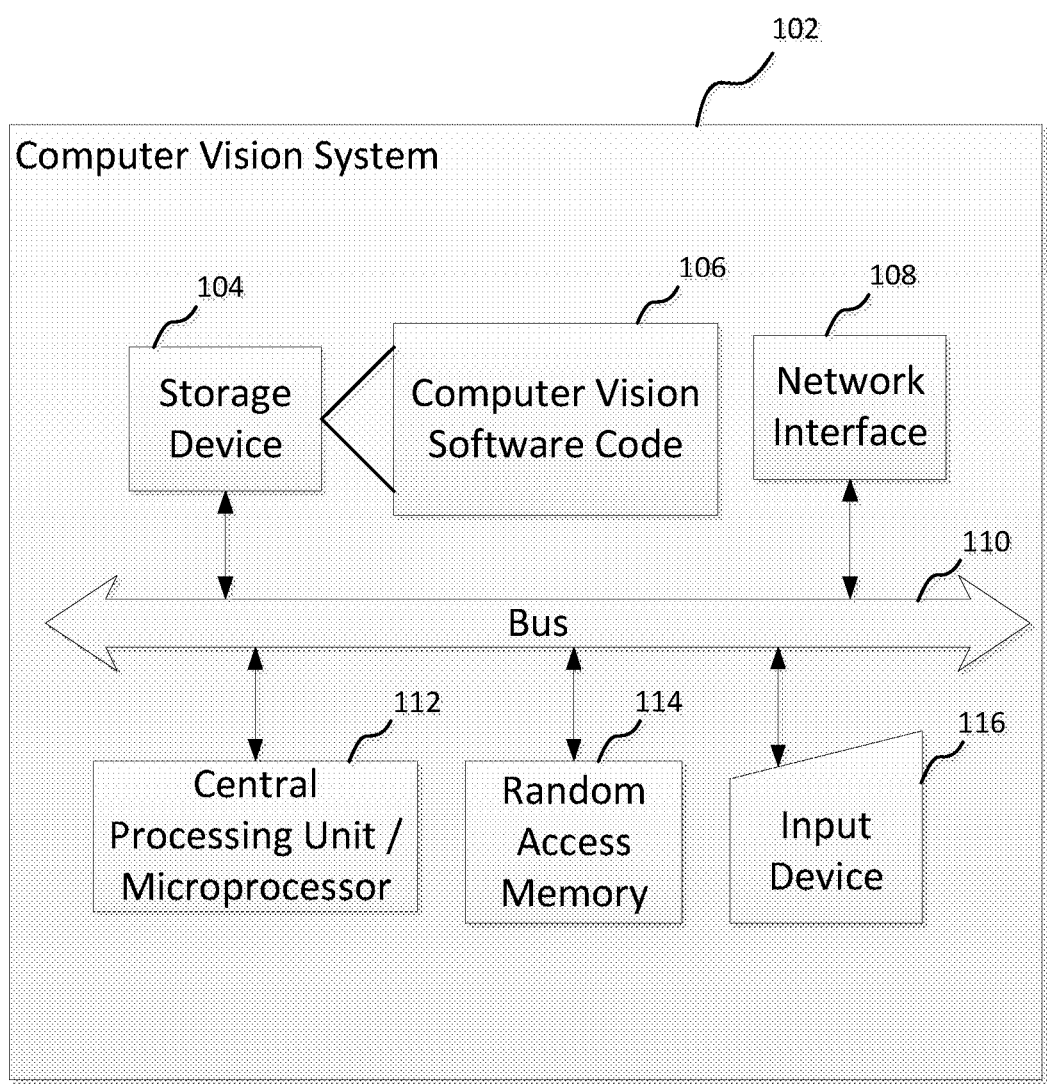
FIG. 13 is a diagram showing hardware and software components of a computer system on which the system of the present disclosure can be implemented.

FIG. 13 is a diagram showing hardware and software components of a computer system 102 on which the system of the present disclosure can be implemented. The computer system 102 can include a storage device 104, computer vision software code 106, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The computer system 102 could be a networked computer system, a personal computer, a server, a smart phone, tablet computer etc. It is noted that the server 102 need not be a networked server, and indeed, could be a stand-alone computer system.

The functionality provided by the present disclosure could be provided by computer vision software code 106, which could be embodied as computer-readable program code stored on the storage device 104 and executed by the CPU 112 using any suitable, high or low level computing language, such as Python, Java, C, C++, C#, .NET, MATLAB, etc. The network interface 108 could include an Ethernet network interface device, a wireless network interface device, or any other suitable device which permits the server 102 to communicate via the network. The CPU 112 could include any suitable single-core or multiple-core microprocessor of any suitable architecture that is capable of implementing and running the computer vision software code 106 (e.g., Intel processor). The random access memory 114 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for object detection with reinforcement learning, comprising:
 a memory storing at least one image; and
 a processor in communication with the memory, the processor:
  setting a plurality of reinforcement learning agent parameters;
  retrieving the at least one image from memory;
  detecting a target object in the at least one image based on the reinforcement learning agent parameters;
  determining a bounding box for the detected target object;
  displaying the bounding box on the image;
  performing reinforcement learning on a portion of the image appearing within the bounding box; and
  when the reinforcement learning agent receives a positive terminal reward, performing at least one of: (1) evaluating whether an optimal number of rewards for the reinforcement learning agent can be improved; or (2) determining a better fitting bounding box.

2. The computer vision system of claim 1, wherein the bounding box magnifies the portion of the image.

3. The computer vision system of claim 2, wherein the bounding box is shifted within the image to magnify the portion of the image.

4. The computer vision system of claim 1, wherein the bounding box is centered within the image.

5. The computer vision system of claim 1, wherein the bounding box magnifies all of the image.

6. The computer vision system of claim 1, wherein the bounding box is split into a first bounding box and into a second bounding box when the processor detects more than one object in a region of the image.

7. The computer vision system of claim 6, wherein the first bounding box is processed if the processor determines that the first bounding box and the second bounding box overlap.

8. The computer vision system of claim 1, wherein the processor selects an aspect ratio and a size of a region of the image.

9. The computer vision system of claim 1, wherein the processor opposes movement of the bounding box in response to a triggering action.

10. The computer vision system of claim 1, wherein the processor is trained with one or more of single class object and multiple class object categories to determine the bounding box.

11. The computer vision system of claim 1, wherein the processor learns to initiate a trigger action for each class category if multiple class objects are detected in the image.

12. A computer vision method for object detection with reinforcement learning, comprising the steps of:
 setting by a processor a plurality of reinforcement learning agent parameters;
 retrieving by the processor at least one image from a memory;
 detecting by the processor a target object in the at least one image based on the reinforcement learning agent parameters;
 determining by the processor a bounding box for the detected target object;
 displaying the bounding box on the image;
 performing by the processor reinforcement learning on a portion of the image appearing within the bounding box; and
 when the reinforcement learning agent receives a positive terminal reward, performing at least one of: (1) evaluating whether an optimal number of rewards for the reinforcement learning agent can be improved; or (2) determining a better fitting bounding box.

13. The computer vision method of claim 12, further comprising magnifying the portion of the image.

14. The computer vision method of claim 13, further comprising shifting the bounding box within the image to magnify the portion of the image.

15. The computer vision method of claim 12, further comprising centering the bounding box within the image.

16. The computer vision method of claim 12, further comprising magnifying all of the image using the bounding box.

17. The computer vision method of claim 12, further comprising splitting the bounding box into a first bounding box and into a second bounding box when more than one object is detected in a region of the image.

18. The computer vision method of claim 17, further comprising processing the first bounding box if the first and second bounding boxes overlap.

19. The computer vision method of claim 12, further comprising selecting by the processor an aspect ratio and a size of a region of the image.

20. The computer vision method of claim 12, further comprising opposing by the processor movement of the bounding box in response to a triggering action.

21. The computer vision method of claim 12, further comprising training the processor with one or more of single class object and multiple class object categories to determine the bounding box.

22. The computer vision method of claim 12, further comprising learning by the processor to initiate a trigger action for each class category if multiple class objects are detected in the image.

* * * * *

UNITED STATES PATENT AND TRADEMARK OFFICE
CERTIFICATE OF CORRECTION

| | | |
|---|---|---|
| PATENT NO. | : 12,067,644 B2 | Page 1 of 1 |
| APPLICATION NO. | : 17/123197 | |
| DATED | : August 20, 2024 | |
| INVENTOR(S) | : Maneesh Kumar Singh and Sina Ditzel | |

It is certified that error appears in the above-identified patent and that said Letters Patent is hereby corrected as shown below:

On the Title Page

Item (72), the city of residence for the first named Inventor should be listed as "Princeton"

Signed and Sealed this
Eighteenth Day of March, 2025

Coke Morgan Stewart
*Acting Director of the United States Patent and Trademark Office*